United States Patent [19]

Watts

[11] 4,030,552

[45] June 21, 1977

[54] PLOW TRIP

[76] Inventor: Glen Armon Watts, Rte. 1, Box 258, McMinnville, Oreg. 97127

[22] Filed: June 4, 1976

[21] Appl. No.: 692,937

Related U.S. Application Data

[63] Continuation of Ser. No. 369,981, June 14, 1973, abandoned.

[52] U.S. Cl. .............................. 172/663; 172/224; 172/705
[51] Int. Cl.² ......................................... A01B 65/00
[58] Field of Search .......... 172/663, 224, 265, 705, 172/491, 264, 710; 92/134; 91/165

[56] References Cited

UNITED STATES PATENTS

| 3,511,050 | 5/1970 | Taberner | 92/134 |
| 3,539,018 | 11/1970 | Sprenkel | 172/491 X |
| 3,662,840 | 5/1972 | Richey | 172/224 |
| 3,672,402 | 6/1972 | Bloemer | 92/134 X |
| 3,760,882 | 9/1973 | Geurts | 172/705 |

Primary Examiner—Stephen C. Pellegrino
Attorney, Agent, or Firm—Oliver D. Olson

[57] ABSTRACT

In a plow assembly, each plow bottom is supported by an arm mounted pivotally on a beam for movement of the plow bottom between outwardly extending and inwardly retracted positions. The beam and each arm are operatively interconnected by an extensible fluid pressure piston-cylinder unit supplied at one end with fluid under pressure, whereby the plow bottom is urged toward said outwardly extending position. The opposite end of the piston-cylinder unit communicates with a sealed chamber containing air or other compressible gas to prevent entrance into the cylinder of air laden with dust and other debris. In a two-way plow assembly, the arms of each opposed pair are interconnected by the fluid pressure piston-cylinder unit, and abutment means interengages each arm and the beam to limit the degree of outward extension of the plow bottoms.

3 Claims, 3 Drawing Figures

U.S. Patent   June 21, 1977   4,030,552
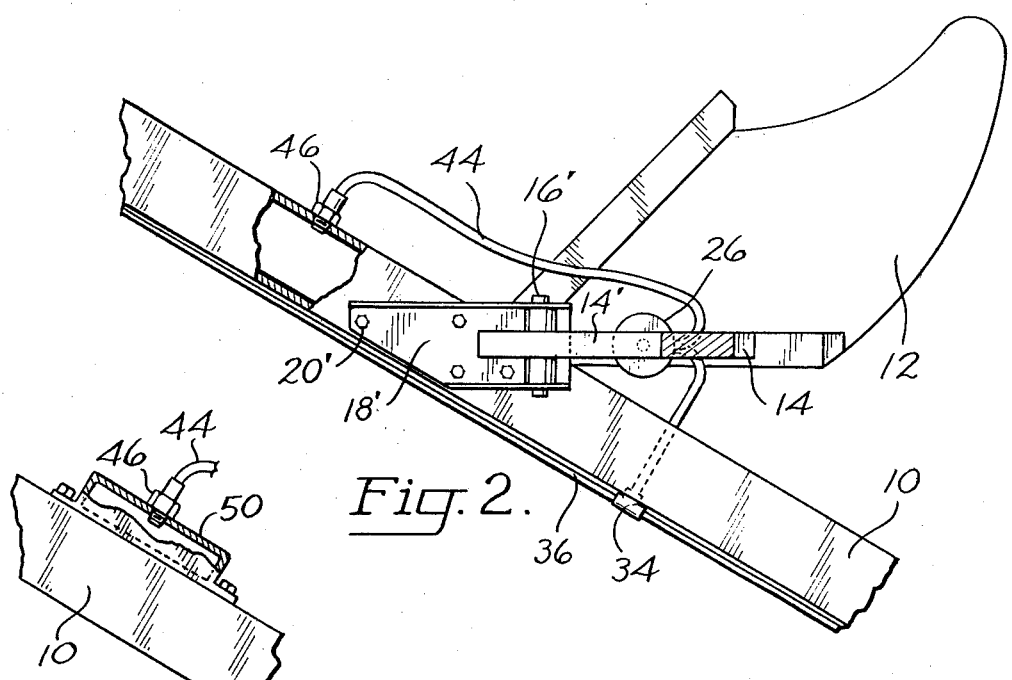
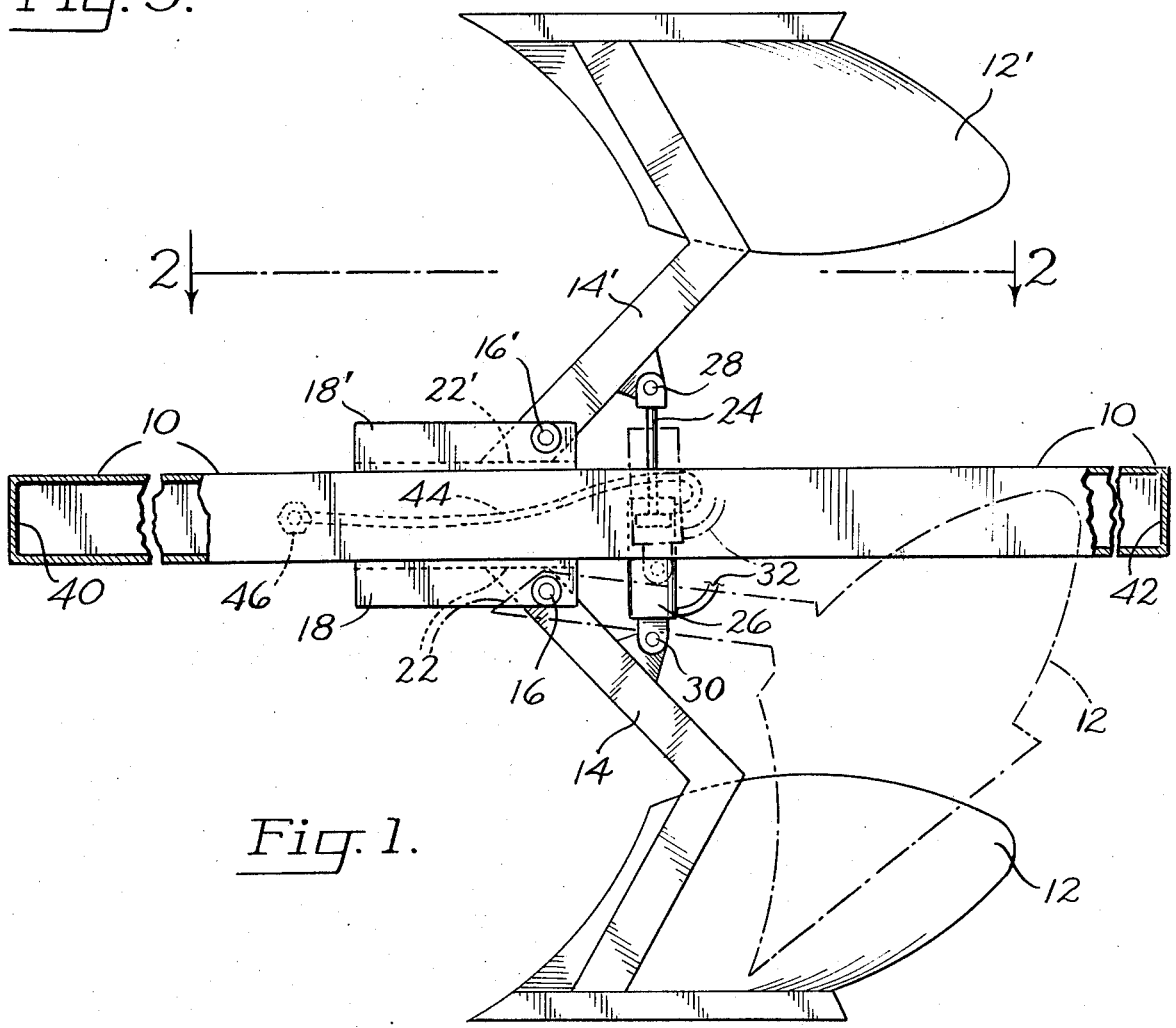

PLOW TRIP

This is a continuation of application Ser. No. 369,981 filed June 14, 1973, now abandoned.

BACKGROUND OF THE INVENTION

This invention relates to earth working plows, and more particularly to a plow assembly in which each plow bottom is biased retractably outward to ground working position for inward deflection upon engagement with an obstacle in the ground.

Retractable plow bottoms of the class described are disclosed in U.S. Pat. No. 3,662,840 wherein opposed pairs of plow bottoms are interconnected by an extensible hydraulic piston-cylinder unit which communicates at one end with a source of hydraulic fluid under pressure, such as an accumulator or a tractor hydraulic system. However, when the supply of hydraulic pressure is an accumulator, the opposite end of each piston-cylinder unit communicates with the atmosphere. Accordingly, with the use of conventional, inexpensive piston-cylinder units wherein the piston rod is much smaller in diameter than the piston and cylinder bore operation of the unit functions to draw into the cylinder thereof dust and other debris carried by the air in proximity to the operating plow assembly. The accumulation of such debris in the cylinder results in excessive and premature wear, damage, or other malfunctioning of the unit, requiring frequent replacement or repair. The patent referred minimizes this result by utilizing expensive piston-cylinder units in which the piston and piston rod have substantially the same diameter as the cylinder bore. When the supply of hydraulic pressure is the hydraulic system of a tractor, the opposite end of each piston-cylinder unit must be supplied with a long conduit for communicating it with a sump associated with a hydraulic system. This represents a costly duplication of hydraulic lines and fittings, and doubles the possibility of line breakage or their damage, with consequent malfunctioning of the system.

SUMMARY OF THE INVENTION

In its basic concept, this invention provides a plow assembly in which an extensible fluid pressure piston-cylinder unit having a piston rod substantially smaller than the piston, operatively interconnects each plow bottom and the plow support, to urge the plow bottom outward and allow inward deflection thereof upon engagement with an obstacle in the ground, the end of each piston-cylinder unit opposite the fluid pressure source communicating with a sealed chamber containing air or other compressible gas.

It is by virtue of the foregoing basic concept that the principal objective of this invention is achieved; namely, to overcome the aforementioned disadvantages of prior plow trip assemblies.

Another important object of this invention is the provision of a plow assembly of the class described which is of simplified construction for economical manufacture and provide maximum operating like with minimum service.

The foregoing and other objects and advantages of this invention will appear from the following detailed description, taken in connection with the accompanying drawing of preferred embodiments.

BRIEF DESCRIPTION OF THE DRAWING

FIG. 1 is a fragmentary view in side elevation of a two-way plow assembly embodying the features of this invention.

FIG. 2 is a fragmentary sectional view taken on the line 2—2 in FIG. 1.

FIG. 3 is a fragmentary plan view of a modified form of sealed chamber arrangement embodying the features of this invention.

DESCRIPTION OF THE PREFERRED EMBODIMENT

Illustrated in the drawing is a portion of an elongated support for a plurality of pairs of opposed plow bottoms. In the illustrated embodiment the support is in the form of an elongated beam 10 which, as disclosed in detail in my earlier U.S. Pat. No. 3,507,334 is mounted on a frame, at an angle thereto, and is arranged for rotation about the axis of the frame, through substantially 180° selectively to move one or the other of the plow bottoms of each pair into ground working position.

Although the drawing illustrates only a single pair of plow bottoms, it will be understood that a plurality of pairs are mounted at spaced intervals along the beam, in identical fashion, to provide a two-way gang plow.

In accordance with this invention, each plow bottom is mounted on the support 10 for movement between an extended position outwardly of the support, as illustrated in full lines in FIG. 1, and the retracted position inwardly toward the support, as indicated in broken lines in FIG. 1.

Since each plow assembly is substantially identical in construction, the components of the upper plow assembly are identified by the same reference numerals as the lower plow assembly, but distinguished therefrom by a superscript.

Thus, in the embodiment illustrated, each of the plow bottoms 12 is mounted at the outer end of an elongated arm 14. The inner end of the arm is secured pivotally, as by a shaft 16, to a channel-shaped bracket 18 secured to the beam 10, as by means of bolts 20.

Abutment means is provided for interengaging the support and each arm to define the limit of outward extension of the arm and supported plow bottom. In the embodiment illustrated, such means is provided by an extension 22 of the inner edge of the arm radially forward of the pivot shaft 16. Thus, in the extended position of the arm 14 said extended edge 22 abuts the adjacent surface of the bracket 18 which constitutes a part of the support.

Means also is provided for urging the plow bottoms outward resiliently to their extended position and to permit retraction of the working plow bottom resiliently upon engagement with an obstacle in the ground. In accordance with this invention, such resilient means comprises a single fluid pressure piston-cylinder unit interengaging the arms 12, 12' of each opposed pair of plow bottoms. The piston rod 24 of the unit extends from the cylinder 26 slidably through the closed end thereof and is connected pivotally at its outer end fo one of the arms by means of a pivot pin 28. The opposite end of the cylinder is connected to the other arm by means of a pivot pin 30. A flexible fluid pressure conduit 32 is connected at one end to the end of the cylinder opposite the piston rod 24 and at its opposite end through a T-coupling 34 to a supply conduit 36 communicating with a source (not shown) of fluid under pressure. The supply conduit extends along the length of the support beam 10 and is provided at appropriately spaced intervals with additional T-couplings and flexible conduits for supplying fluid under pressure to the piston-cylinder units associated with other pairs of plow bottoms.

The source of fluid pressure may be compressed air, or other gas such as nitrogen. The source preferably is hydraulic fluid under pressure, of the gas-over-oil type.

In accordance with this invention, the piston-cylinder unit is of the inexpensive, conventional type in which the piston rod 24 is substantially smaller in diameter than the piston and cylinder bore, and the end of the cylinder 26 opposite supply conduit 32 communicates with a sealed chamber containing air or other compressible gas, such as nitrogen. In the embodiment illustrated in FIGS. 1 and 2, the sealed chamber is formed by providing beam 10 as a hollow tube closed at its opposite ends by end walls 40 and 42. A short length of flexible hose 44, or other suitable form of conduit, communicates at one end with the cylinder 26 and at the opposite end with the interior of the hollow tube, through a conventional fitting 46.

In the embodiment illustrated in FIG. 3, the sealed chamber is provided by a small sealed tank 50 secured to the beam 10. In this instance the beam may be a structural member of any desired configuration, such as an I-beam, channel beam, etc. One of the tanks 50 may serve one or a plurality of piston-cylinder units, as desired.

In the operation of the plow assembly described hereinbefore, fluid under pressure is applied to all of the piston-cylinder units, causing them to extend. The air or other gas on the piston rod side of each piston is expelled into the sealed chamber formed by the hollow beam 10 or tank 50. Extension of the piston-cylinder units functions to move the associated pairs of plow bottoms 12 outward to their extended positions illustrated in full lines in FIG. 1. This position of full extension is determined by abutment of the forward extension 22 of the inner edge of each arm 14 with the adjacent surface of the mounting bracket 18.

In the event a working plow bottom engages a rock or other obstacle in the ground as the plow is moved forward, the associated arm 14 is permitted to rotate counterclockwise (FIG. 1) about its mounting shaft 16 and against the resilient resistance of fluid pressure in the associated piston-cylinder unit. In this manner the plow bottom is allowed to elevate sufficiently to clear the obstacle. During this retraction of the working plow bottom, the associated piston-cylinder unit shortens in length, as the arm 14 of the working plow bottom pivots counterclockwise, and the arm 14' of the non-working plow bottom is retained in its fully extended position by virtue of the abutment of the extension 22' of the inner edge of the arm with the support bracket 18'.

Retraction of the piston within each unit is accompanied by drawing air or other gas from the sealed chamber into the cylinder, as will be understood. Thus, the units are protected against the entrance from the atmosphere of air laden with dust and other abrasive or otherwise deleterious materials which, by the nature of use of the plow, are present in the air in the proximity of the equipment. In this manner the units are protected against excessive wear and other damage, thereby insuring maximum operating life.

When the working plow bottom has passed over the obstacle in the ground, it is quickly returned to working position by virtue of the resilient fluid pressure in conduit 32 which causes extension of the piston-cylinder unit, as will be understood.

It will also be understood that the same mode of operation obtains when the support is rotated to bring the upper plow bottoms 12' into ground working position.

It is to be noted from the foregoing that both plow bottoms of each pair in the two-way plow assembly are resiliently retractable and that this is accomplished by means of a single fluid pressure piston-cylinder unit associated with each pair of plow bottoms. This arrangement not only minimizes the number of components in the assembly, thereby correspondingly minimizing the cost of manufacture, maintenance and repair, but it also renders the assembly adaptable to most conventional two-way plow assemblies.

Further, by communicating the end of each cylinder 26 opposite the fluid pressure line 32 with a sealed chamber, such as hollow beam 10 or tank 50, the interior of each unit is maintained free of dust and other abrasive or otherwise deleterious material, whereby to obtain maximum operating life of the units with minimum maintenance, repair and replacement.

It will be apparent that the piston-cylinder unit described hereinbefore may also be used as a trip mechanism for a single plow. In such instance one end of the unit is connected pivotally to the plow support beam 10 and the opposite end is connected pivotally to the support arm 14 of the plow bottom. In either instance, it is apparent that the piston-cylinder unit functions to operatively interconnect the support beam 10 and a plow bottom, to allow retraction and extension of the latter. Thus, in the case of a single plow bottom, the piston-cylinder unit operatively interconnects the beam and plow bottom by direct connections thereto. In the case of the two-way plow arrangement illustrated, the piston-cylinder unit operatively interconnects the beam 10 and each plow bottom indirectly through the forward extension 22 or 22' of the opposite plow bottom of the pair.

It will also be apparent that the trip mechanism of this invention may be employed with various types of plows, other than those of the mold board type illustrated. For example, the plow may be of the type in which the ground-working bottom member is in the form of a chisel, disc, or other configuration.

It will be further apparent to those skilled in the art that various other changes may be made in the size, shape, type, number and arrangement of parts described hereinbefore, without departing from the spirit of this invention.

Having now described my invention and the manner in which it may be used, I claim:

1. In combination with a plow having a support, a ground-working plow member mounted on the support for movement relative thereto-between an outwardly extended this position and an inwardly retracted position,
 a. a fluid pressure piston-cylinder unit operatively interconnecting the support and plow member, the piston-cylinder unit having a piston rod of substantially smaller diameter than the cylinder bore extending fro one end of the cylinder.
 b. means communicating only the piston end of the cylinder of said unit with a source of hydraulic fluid pressure for urging the plow member toward said outwardly extended position, c. a constant volume sealed chamber carried by the support and containing only compressible gas, and d. conduit means communicating the chamber with the piston rod end of the cylinder for confining compressible gas only for movement between the piston rod end of the cylinder and the chamber during extension and retraction of the piston-cylinder unit.

2. The combination of claim 1 wherein the support includes a hollow sealed member forming said sealed chamber.

3. The combination of claim 1 wherein the sealed chamber comprises a sealed tank mounted on the plow.

* * * * *